United States Patent [19]
Behle et al.

[11] 4,456,220
[45] Jun. 26, 1984

[54] NOZZLE ASSEMBLY FOR TOP OPERATING ROD

[75] Inventors: Gunter R. Behle, St. Peters; Joel A. Mingus, St. Charles, both of Mo.

[73] Assignee: ACF Industries, Incorporated, New York, N.Y.

[21] Appl. No.: 268,969

[22] Filed: Jun. 1, 1981

[51] Int. Cl.³ ............................................. F16K 51/00
[52] U.S. Cl. ................................... 251/144; 251/214; 277/DIG. 6
[58] Field of Search ....................... 251/144, 214, 291; 277/DIG. 6

[56] References Cited

U.S. PATENT DOCUMENTS

| | | | |
|---|---|---|---|
| 2,190,723 | 2/1940 | McBride | 251/144 |
| 3,801,235 | 4/1974 | Douglas | 277/DIG. 6 |
| 4,141,535 | 2/1979 | Reedy et al. | 251/291 |
| 4,265,457 | 5/1981 | Lambie | 251/214 |
| 4,326,557 | 4/1982 | Behle | 251/144 |

Primary Examiner—A. Michael Chambers
Attorney, Agent, or Firm—Henry W. Cummings

[57] ABSTRACT

In accordance with the present invention, an operating rod attached to a bottom outlet valve passes through a nozzle assembly connected to the tank top. The nozzle assembly includes a hollow cylindrical housing for the operating rod and means to seal the operating rod relative to the tank. The nozzle assembly further includes a sleeve made of a material having a coefficient of friction with metal, particularly steel. The material has sufficient shear strength to withstand loads applied by rotation of the operating rod to the nozzle assembly, and sufficient strength in compression to react bending moments applied to the nozzle assembly resulting from misalignment of the lading valve relative to the nozzle assembly. Preferably also the material is self lubricating to avoid potential failure of the material in the event the assembly is not regularly lubricated.

10 Claims, 2 Drawing Figures

NOZZLE ASSEMBLY FOR TOP OPERATING ROD

BACKGROUND OF THE INVENTION

In the past, considerable difficulty has occurred in assembling tanks in attempting to align the nozzle or top operator guide located in the top of the tank with the outlet valve located in the bottom of the tank. An operating rod extends through the nozzle to operate the lading valve in the tank bottom. This method of building tanks often results in a vertical multi-directional misalignment between the nozzle and the lading valve of between ½° to 3°.

Misalignment in turn causes the packing in the nozzle to be moved to one side due to the binding of the upper part of the operating rod in the nozzle, enabling commodity to bypass the packing. This also reduces the service life of the packing, valve stem and sleeve.

One way to avoid this alignment problem is to use a solid rod fixture bolted to the bottom of the tank which establishes and protrudes through the opening in the top of the tank and which receives the nozzle prior to tack welding the nozzle to a nozzle reinforcing pad. However, the use of this heavy rod fixture is awkward.

Workmen with gun sights located on top of the tank have also attempted to sight a target located on the bottom outlet mounting flange in the tank bottom, and tack welding the nozzle to the nozzle reinforcng pad when the target is sighted. However, such sighting is time comsuming, particularly in limited lighting in tank assembly plants which makes this technique difficult. It is even more difficult when shifts are operating during the darkness hours.

While application Ser. No. 244,500 filed Mar. 16, 1981 now U.S. Pat. No. 4,372,025, issued Feb. 8, 1983, disclosed the use of a light source to achieve alignment of the outlet valve assembly with the nozzle assembly, this technique is not adapted to retrofit of existing cars where misalignment exists.

SUMMARY OF THE INVENTION

In accordance with the present invention an operating rod attached to a bottom outlet valve passes through a nozzle assembly connected to the tank top. The nozzle assembly includes a hollow cylindrical housing for the operating rod and means to seal the operating rod relative to the tank. The nozzle assembly further includes a sleeve made of a material having a low coefficient of friction with metal, particularly steel. The material has sufficient shear strength to withstand loads applied by rotation of the operating rod to the nozzle assembly, and sufficient strength in compression to react bending moments applied to the nozzle assembly resulting from misalignment of the lading valve relative to the nozzle assembly. Preferably also the material is self lubricating to avoid potential failure of the material in the event the assembly is not regularly lubricated.

With a sleeve made of this material, considerable misalignment between the lading valve and the nozzle assembly of up to 1¾ inches and higher can be tolerated without failure of the operating rod and/or the sleeve in the nozzle assembly. Furthermore, there is much less tendency for the operating rod to become bound in place with this nozzle assembly.

IN THE DRAWINGS

DESCRIPTION OF PREFERRED EMBODIMENTS

Figure 1:
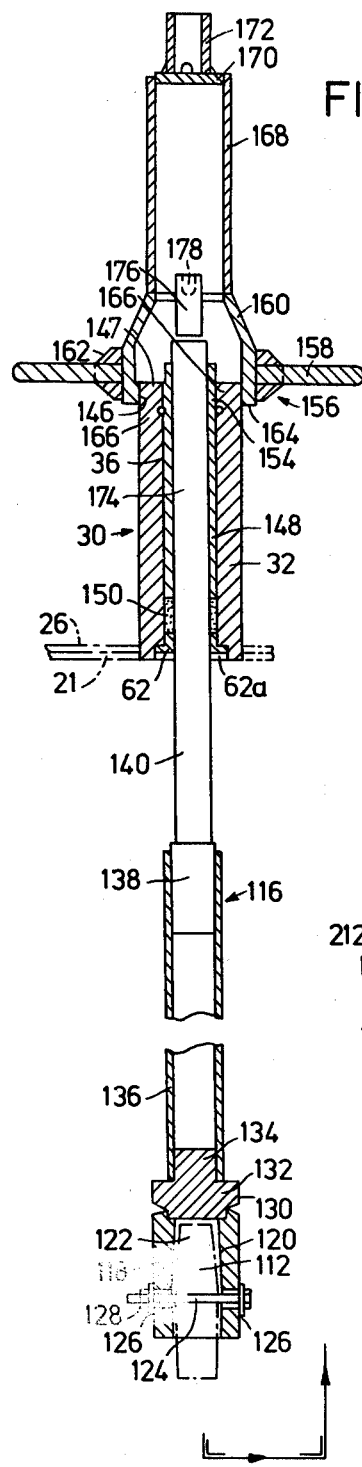
FIG. 1 is a vertical side elevation view illustrating the nozzle assembly of the present invention.

The construction of the nozzle assembly, bottom outlet valve assembly and operating rod extending from the bottom outlet valve assembly to the nozzle assembly is disclosed in application Ser. No. 142,309 filed Apr. 21, 1980 now U.S. Pat. No. 4,326,557, issued Apr. 27, 1982 and Ser. No. 244,500 filed Mar. 16, 1981 now U.S. Pat. No. 4,372,025 issued Feb. 8, 1983. These applications are hereby incorporated into the present application by this reference.

As is disclosed in these applications, a nozzle assembly 30 includes a hollow cylindrical nozzle housing 32 and a locating plate 62 having an opening 62a. Sealing means 150 for sealing a top operating rod and a sleeve 148 are inserted into nozzle slot 36 and are held in place by a cap 154 engaging an "O" ring 155 and extending into upper threaded portion 166. An operating rod 140 is then inserted into the assembly extending downwardly to a bottom outlet valve closure 232. Previously, sleeve 148 was made of steel.

In accordance with the invention, the material chosen for sleeve 148 should have a coefficient of friction with the operating rod material (normally steel) of not more than about 0.2, preferably not more than 0.15.

Means are also provided to prevent rotation of the sleeve within the nozzle. For example, a cap 154 may be threaded into cylinder 146 which engages the sleeve and prevents rotation thereof.

Rotation of the operating rod 140 tends to shear the sleeve. Therefore the material for sleeve 148 should have a shear strength of at least 600 psi to prevent shearing of the sleeve.

Furthermore, misalignment between the nozzle assembly 30 and the lading valve assembly 234 applies a compressive bending load upon the sleeve. Therefore the sleeve should have a compressive strength to resist this bending load of at least about 1,000 psi at 150° F.

Preferably, the sleeve material is also self lubricating so that effectiveness in service does not depend upon following a lubricating schedule which experience has shown is often unreliable in the railway industry.

The sleeve is conveniently but not necessarily cylindrical. It's external shape must cooperate with housing 146 and/or cap 154 to prevent the sleeve from rotating when the operating rod is rotated.

Nylon based materials possess the necessary low coefficient of friction, shear strength and compressive strength to function satisfactorily. A preferred material is type 6/6 Nylon. Specific examples of suitable materials include Nylatron ® Resin 101. Self lubricating materials include Nylatron GS. For heavy load applicators where significant misalignment exists a nylon based material containing glass fibers such as Nylatron ®51 may be used.

Other suitable materials include polyolefins, halogenated polyolefins (ie. polytetrafluoroethylene) polycarbonates and polyesters. Examples of suitable materials are found in the brochure "Properties of Polypenco Industrial Plastics", available from the Polymer Corporation, Reading, Pa. 19603, hereby incorporated into this application by this reference. Copy of brochure in application file. A preferred material is Nylatron ®GS having a thickness of about ¼ inch and a length of 6 inches.

Figure 2:
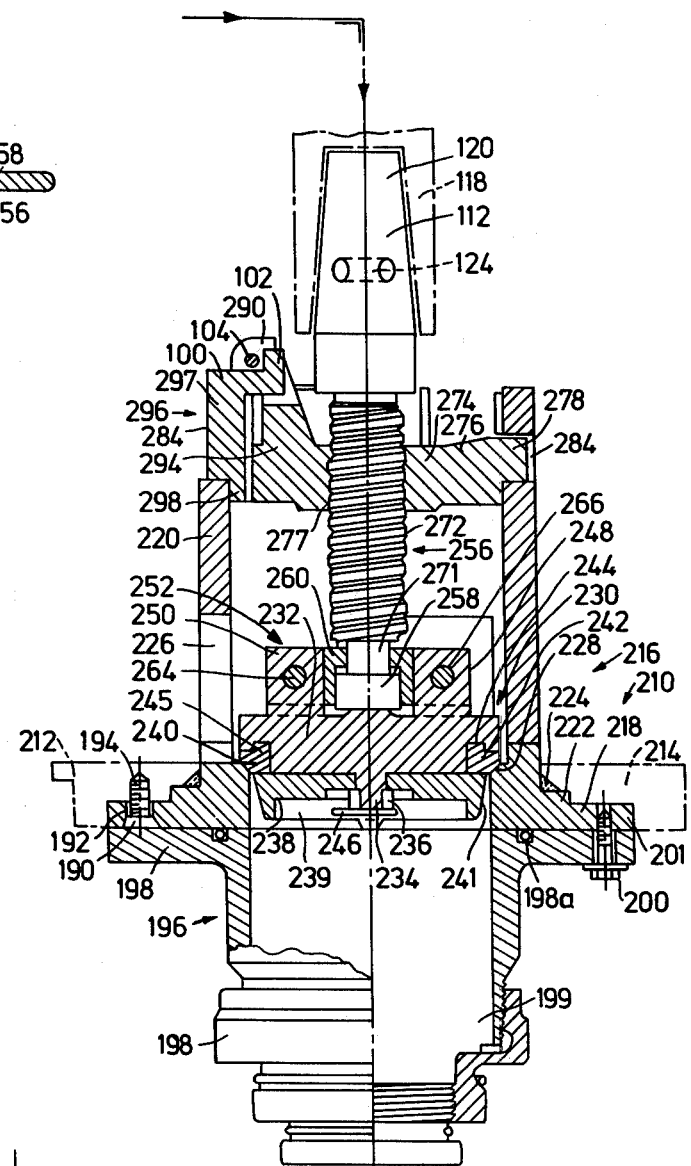
FIG. 2 is a side elevation view of the bottom portion of the operating rod and its attachment to a railway tank car bottom outlet valve.

As is described in greater detail in said U.S. application Ser. Nos. 142,309 and 244,500, rod 140 is connected to a bottom outlet valve closure 234. As shown in FIGS. 1 and 2, stem 256 includes a non-round connection portion 112 and an opening 124. Operating rod 140 includes a lower portion 116 including pipe 136 and rod 118 having an opening 120 adapted to receive the stem portion 112. It is to be noted that the stem portion is rounded at 122 to provide freedom of movement of the stem relative to the rod connecting portion 118, similar to a universal joint. A fastener 124 together with washers 126 and a nut 128 hold the stem portion 112 in engagement with the rod 118.

Rod 118 is welded to a connecting member 130 having a rectangular portion 132 and a circular portion 134 which extends upwardly toward the top of the tank. Operating rod 140 includes a lower cylindrical portion 138 which extends within pipe 136.

An operating handle assembly 156, which can also be a one piece casting, includes a handle portion 158 and a body portion 160 jointed together with gussets or ribs 162. Handle body portion 160 includes a threaded portion 164 which engages threaded portion 166 of the casing 32. Handle body portion 160 is welded to a tubular member 168 and a closure plate 170 is welded to the tube 168 at its upper end. A non-round operating portion 172 is welded to the plate 170.

Operating rod 140 includes a circular portion 174 extending within packing 150 and guide 148. At the upper end of circular portion 174 a non-round connection portion 176 is provided. The connection portion 176 is of smaller cross section than is the handle connection portion 172. Therefore when the handle assembly 156 is removed from the threaded casing 146, the handle connection portion 172 is inserted over the rod connection portion 176 and the valve assembly at the bottom of the tank may be rotated by virtue of the handle assembly 156.

It will be noted that rod connection portion 176 includes a threaded connection slot 178. A bottom installation operator (not shown) is provided which is utilized to raise and lower the valve assembly in the bottom of the tank during installation or removal of the valve assembly from the bottom of the tank. This handle assembly includes a threaded projection which extends within the slot 178 in the handle portion 174.

In operation, in order to install the bottom operable valve assembly of the present invention, the handle assembly is connected to the exposed rod 174 with connection portion 182 threaded into threaded connection slot 178. The attendant then lowers operating rod 140 an amount sufficient for rod portion 118 to extend below the bottom flange 214. With the bottom operable valve assembly assembled as described above, the valve stem 112 is extended into the slot 120 of rod portion 118 and the fastener 124, washers 126 and nut 128 attached, as shown in FIGS. 1 and 2. If there is an attendant on the top of the tank, this attendant then raises the connected assembly upwardly until the flange portion 218 engages the tank bottom mounting flange 214.

The upper operating portion 174 will move more readily than previously and slide through the sleeve 148 due to the low coefficient of friction. It is possible for a single attendant to raise the valve assembly from the bottom because the assembly and rod only weight 70–80 pounds. When the flange portion 218 engages the tank mounting flange 214, countersunk valve assembly fasteners 190 are inserted from the bottom into openings 192 in the valve flange, and openings 194 in the tank bottom mounting flange.

An outlet chamber 196 having a flange 198 and a seal 198a is then attached to flange portion 218 with fasteners 200 extending into openings 201 preferably located on the same bolt circle as fasteners 190. Fasteners 200 are of the type which will shear off upon hard impact to the outlet chamber 196. Obviously this outlet chamber would be removed before attempting to install a new lading valve operable from the top. Thus it is not necessary to provide a skid for this assembly as required in certain AAR and DOT regulations concerning projections of the tank bottom in excess of one (1) inch. A threaded cap 198 closes on opening 199 in the bottom of the outlet chamber. The lading is removed from the tank by means of a suitable discharge conduit (not shown) connected to the outlet chamber 196 in a known manner. Valve closure 232 is moved between open and closed position by rotation of handle assembly 156 with handle connection portion 172 engaging operating rod connection portion 176.

To complete the embodiments shown in FIG. 2, a railway tank car 210 includes a tank bottom 212 having a tank mounting flange 214. A combination valve mounting flange, valve cage and valve seat indicated generally at 216 is provided. This includes a flange portion 218 extending radially outwardly from a valve cage portion 220. Flange portion 218 includes a step 222. An O ring seal 224 is provided between the mounting flange 214 and the valve flange 218.

Cage portion 220 includes a plurality of openings 226 for lading flow. A valve seat 228 is provided on the inner surface of flange portion 218.

A valve closure 230 includes a body portion 232 having depending therefrom a stud 234. Stud 234 is threaded and receives a threaded nut 236 which holds a seal retainer 238 in engagement with a circumferential seal 240 located in a slot 242. Slot 242 includes an upper portion 244 and seal 240 includes an upper portion 246 to prevent loss of seal from the closure, in the event the seal becomes bound to the valve seat 228. A cotter pin 246 extending through stud 234 and nut 236 is used to hold the nut in place. Seal retainer 238 includes a slot 239 to save weight, and a depending valve guide portion 241 to guide movement of closure 230 toward the cage center while closing the valve.

Valve closure 230 further includes a pair of upwardly extending lugs 248 and 250. A stem clamp assembly 252 engages either side of lugs 248 and 250. A stem 256 includes a lower circular portion 258 which is located within semi-circular portion 260 of clamp assembly 252. Bolts 264 and 266 hold the clamp assembly in engagement with lugs 248 and 250 and semi-circular portion 260 in engagement with stem circular portion 258. The stem 256 is integrally connected to the valve closure 230.

Stem 256 further includes a portion of reduced cross section 271 and a threaded body portion 272. A sleeve 274 includes body portion 276 having a threaded opening 277 which is attached to threaded stem portion 272. Sleeve 274 further includes a plurality of radial arm portions 278. When the assembly of the valve closure stem retainer clamps and stem are inserted into the valve cage portion 220, the arm portions 278 fit within slots 284 in the valve cage. A pair of lugs 290 extend upwardly and outwardly from a lug base portion 294 which is integral with sleeve body portion 276. Lugs 290 are thus located over one of cage slots 284.

A key 296 includes a body portion 297 generally in the form of a partial cylinder and includes a lower stem 298 which extends partly down cage wall 220. Key 296 further includes an upper radial portion 100 extending inwardly of the cage and an upper extension 102. Lower step 298 and upper extension 102 tend to cause key 296 to move inwardly toward the center of the cage rather than outwardly and out of the cage. However, key 296 is trapped both vertically and laterally by means of a cotter pin 104 which extends through openings 290a and lugs 290.

Once the valve closure stem 256 and sleeve 274 have been located within the cage 220 with the seal 240 engaging the seat 228, and the sleeve arms 278, key 296 and cotter 104 in place, the stem can then be connected to operating rod 140 extending to the top of the tank, as described above.

To insert a new sleeve 148, the operating rod 140 and valve closure assembly 216 is lowered until the operating rod is below the nozzle assembly. Cap 154 and sleeve 148 are removed and a new sleeve 148 inserted. The operating rod 140 is then reinserted into the nozzle assembly as described above.

Top operated bottom tank valve assemblies in which the nozzle assembly of the present invention has been utilized have not experienced as great leakage problems and wear problems as have occurred with prior art nozzle assemblies where substantial misalignment exists between the nozzle and the bottom outlet valve. Furthermore, the operating rod has become bound in the nozzle assembly much less frequently, and there have been much fewer instances of failure of the operating rod in cases where the nozzle assembly of the present invention has been utilized.

What is claimed is:

1. In a tank assembly including an operating rod attached to the bottom outlet valve and passing through a tank body, through a threaded guide, and through a nozzle assembly including a hollow cylindrical housing for the operating rod extending only partially into said tank body; and means for sealing the operating rod relative to the tank, the improvement comprising: a sleeve located within said housing; said operating rod extending through said sleeve; means for preventing said sleeve from rotating during rotation of the operating rod; said sleeve having a sufficiently low coefficient of friction with metal to allow the operating rod to easily rotate relative to the sleeve; and said sleeve having a sufficient shear strength to withstand loads applied by rotation of the operating rod to the nozzle assembly, and sufficient strength in compression to react bending moments applied to the nozzle assemlby resulting from misalignment of the lading valve realtive to the nozzle assembly.

2. A tank assembly according to claim 1, wherein the threaded guide is located above the bottom outlet valve in the lower portion of the tank body.

3. The improvement according to claim 1, wherein the means for preventing the sleeve from rotating comprise a threaded cap.

4. The improvement according to claim 1, wherein the sealing means comprise a packing and wherein said packing is held in place within the sleeve with a locating plate.

5. The improvement according to claim 1, wherein the material is self lubricating.

6. The improvement according to claim 1, wherein the material has a coefficient of friction with metal of not more than about 0.2.

7. The improvement according to claim 6, wherein the material has a shear strength of at least 600 psi.

8. The improvement according to claim 7, wherein the material has a compressive strength of at least about 1,000 psi at 150° F.

9. The improvement according to claim 8, wherein the material is selected from nylon, polyolefins, halogenated polyolefins, polycarbonates and polyesters.

10. The improvement according to claim 9, wherein the material is nylon.

* * * * *